(12) United States Patent
Choi

(10) Patent No.: US 10,701,617 B2
(45) Date of Patent: Jun. 30, 2020

(54) MOBILE RELAY, MEANS OF TRANSPORTATION COMPRISING SAME, AND TERMINAL OPERATED BY MOBILE RELAY

(71) Applicant: INDUSTRY-ACADEMIC COOPERATION FOUNDATION, DANKOOK UNIVERSITY, Yongin-si (KR)

(72) Inventor: SuHan Choi, Gwacheon-si (KR)

(73) Assignee: Industry-Academic Cooperation Foundation, Dankook University, Yongin-si (KR)

(*) Notice: Subject to any disclaimer, the term of this patent is extended or adjusted under 35 U.S.C. 154(b) by 107 days.

(21) Appl. No.: 15/304,378

(22) PCT Filed: Apr. 15, 2015

(86) PCT No.: PCT/KR2015/003784
§ 371 (c)(1),
(2) Date: Oct. 14, 2016

(87) PCT Pub. No.: WO2015/160186
PCT Pub. Date: Oct. 22, 2015

(65) Prior Publication Data
US 2017/0048782 A1    Feb. 16, 2017

(30) Foreign Application Priority Data
Apr. 15, 2014    (KR) .................. 10-2014-0044709

(51) Int. Cl.
*H04B 7/14*        (2006.01)
*H04W 40/22*    (2009.01)
(Continued)

(52) U.S. Cl.
CPC .......... *H04W 40/22* (2013.01); *H04B 7/0404* (2013.01); *H04L 1/1614* (2013.01);
(Continued)

(58) Field of Classification Search
CPC ... H04W 88/04; H04W 40/22; H04W 84/047; H04B 7/15507; H04B 7/155; H04B 7/14
See application file for complete search history.

(56) References Cited

U.S. PATENT DOCUMENTS 8,488,514 B2    7/2013    Cai et al.
8,494,593 B2    7/2013    Black et al.
(Continued)

FOREIGN PATENT DOCUMENTS

KR    10-2011-0036691 A    4/2011
KR    10-2011-0089442 A    8/2011
(Continued)

OTHER PUBLICATIONS

International Search Report dated June 22, 2015 in counterpart International Application No. PCT/KR2015/003784 (3 pages in Korean).

*Primary Examiner* — Atique Ahmed
(74) *Attorney, Agent, or Firm* — NSIP Law

(57) ABSTRACT

The mobile relay according to one embodiment of the present invention comprises: a base station communication unit for transmitting/receiving data to/from a base station through a backhaul link; a sensing unit for sensing the state of the backhaul link; a control unit for determining a transmission mode and a transmission format for a terminal in view of the sensed state of the backhaul link; and a terminal communication unit for transmitting the determined transmission mode and transmission format to the terminal.

16 Claims, 11 Drawing Sheets

(51) Int. Cl.

| | | |
|---|---|---|
| *H04W 48/02* | (2009.01) | |
| *H04B 7/0404* | (2017.01) | |
| *H04L 1/16* | (2006.01) | |
| *H04W 74/08* | (2009.01) | |
| *H04W 88/04* | (2009.01) | |
| *H04W 28/18* | (2009.01) | |
| *H04B 1/3827* | (2015.01) | |

(52) U.S. Cl.
CPC ....... *H04W 48/02* (2013.01); *H04W 74/0833* (2013.01); *H04B 1/385* (2013.01); *H04W 28/18* (2013.01); *H04W 88/04* (2013.01)

(56) References Cited

U.S. PATENT DOCUMENTS

| | | | |
|---|---|---|---|
| 9,001,752 B2 | 4/2015 | Miyatake et al. | |
| 9,001,767 B1* | 4/2015 | Gatewood | H04W 72/04 370/328 |
| 2003/0054843 A1* | 3/2003 | Notani | H04W 16/18 455/466 |
| 2008/0013558 A1* | 1/2008 | Ito | H04W 36/08 370/404 |
| 2008/0080436 A1* | 4/2008 | Sandhu | H04W 52/143 370/338 |
| 2009/0021572 A1* | 1/2009 | Garudadri | H04L 47/10 348/14.01 |
| 2009/0129576 A1* | 5/2009 | Yamanashi | H04M 3/56 379/202.01 |
| 2010/0182906 A1* | 7/2010 | Cheng | H04L 41/5019 370/234 |
| 2011/0080864 A1* | 4/2011 | Cai | H04W 36/30 370/315 |
| 2012/0028627 A1* | 2/2012 | Hunzinger | H04W 36/00837 455/422.1 |
| 2012/0147794 A1* | 6/2012 | Chung | H04L 5/0057 370/280 |
| 2012/0147831 A1* | 6/2012 | Golitschek | H04L 1/0026 370/329 |
| 2012/0224472 A1 | 9/2012 | Kim et al. | |
| 2012/0307733 A1* | 12/2012 | Kim | H04L 1/0031 370/328 |
| 2012/0315916 A1* | 12/2012 | Van Phan | H04W 36/08 455/442 |
| 2013/0059585 A1* | 3/2013 | Giloh | H04L 45/54 455/436 |
| 2013/0090055 A1* | 4/2013 | Pitakdumrongkija | H04B 7/15 455/9 |
| 2014/0016537 A1* | 1/2014 | Khobare | H04W 36/30 370/315 |
| 2014/0376517 A1* | 12/2014 | Geirhofer | H04W 36/30 370/332 |
| 2015/0011158 A1* | 1/2015 | Luo | H04W 16/26 455/11.1 |

FOREIGN PATENT DOCUMENTS

| | | |
|---|---|---|
| KR | 10-2013-0007959 A | 1/2013 |
| KR | 10-2013-0042655 A | 4/2013 |

\* cited by examiner

MOBILE RELAY, MEANS OF TRANSPORTATION COMPRISING SAME, AND TERMINAL OPERATED BY MOBILE RELAY

CROSS-REFERENCE TO RELATED APPLICATIONS

This application claims the benefit under 35 USC 119(a) of PCT Application No. PCT/KR2015/003784, filed on Apr. 15, 2015, which claims the benefit of Korean Patent Application No. 10-2014-0044709 filed Apr. 15, 2014, in the Korean Intellectual Property Office, the entire disclosure of which is incorporated herein by reference for all purposes.

TECHNICAL FIELD

Embodiments of the present disclosure relate to a wireless communication system, and more particularly, to a transportation means including a mobile relay and a terminal operated by the mobile relay.

BACKGROUND ART

In a communication system, a relay has been introduced to eliminate a shadow area. A repeater technology has been evolved from a simple amplify- and forward method to a method which is made intelligent such as decode-and-forward, reconfiguration/reallocation- and forward, and the like.

In particular, in a next-generation mobile communication system, introduction of a plurality of relays which are made intelligent may be unavoidable in order to enlarge the coverage and to improve data throughput while reducing the costs of installing more base stations and maintenance costs of a backhaul communication network.

In addition, in recent years, a mobile relay whose position is flexible as well as a fixed relay whose position is fixed has been used in a communication system.

However, as to such a mobile relay, there is no problem with data communication when a state of a backhaul link between a donor eNodeB that provides a backhaul link to the mobile relay and the mobile relay is good, but there is a problem with the data communication when the state of the backhaul link is bad.

Therefore, in recent years, there has been a demand for more efficient transmission method of a mobile relay that can transmit and receive data in consideration of the state of the backhaul link.

DISCLOSURE

Technical Problem

The present disclosure is directed to provide a mobile relay that can efficiently transmit and receive data in consideration of a state of a backhaul link.

Technical Solution

One aspect of the present disclosure provides a mobile relay including: a base station communication unit that transmits and receives data to and from a base station through a backhaul link; a sensing unit that senses a state of the backhaul link; a control unit that determines a transmission mode and transmission format of a terminal in consideration of the sensed state of the backhaul link; and a terminal communication unit that transmits the determined transmission mode and transmission format to the terminal.

Here, the terminal communication unit may transmit the state of the backhaul link to the terminal and receive channel information of an access link in response to the state of the backhaul link from the terminal, and the control unit may determine the transmission mode and transmission format of the terminal based on the channel information of the access link.

Also, the terminal communication unit may receive a transmission mode of the access link with the terminal while receiving the channel information of the access link, and the control unit may set the state of the backhaul link, a transmission mode, the transmission mode of the access link transmitted from the terminal, a relational expression for channel information, or an offset value to determine the transmission mode and transmission format of the terminal.

Also, the control unit may determine the number of terminals which can be simultaneously connected or terminals whose simultaneous connections are allowed, based on the state of the backhaul link, a service type of the terminal, or a required QoS (quality of service).

Also, the control unit may increase the number of terminals which can be simultaneously connected as the state of the backhaul link gets better, and reduce the number of terminals which can be simultaneously connected as the state of the backhaul link gets worse.

Also, the terminal communication unit may inform the terminal of whether transmission of a random access signal is allowed, in the form of a bitmap in advance.

Also, when the backhaul link is in a state incapable of processing connection attempts of all subscribed terminals, the control unit may instruct some terminals in which processing is disabled to perform communication by using a different communication method other than a current communication method.

Another aspect of the present disclosure provides a transportation means to which a mobile relay is attached, wherein the mobile relay includes a base station communication unit that transmits and receives data to and from a base station through a backhaul link; a sensing unit that senses a state of the backhaul link; a control unit that determines a transmission mode and transmission format of a terminal in consideration of the sensed state of the backhaul link; and a terminal communication unit that transmits the determined transmission mode and transmission format to the terminal.

Here, the terminal communication unit may transmit the state of the backhaul link to the terminal and receive channel information of an access link in response to the state of the backhaul link from the terminal, and the control unit may determine the transmission mode and transmission format of the terminal based on the channel information of the access link.

Also, the terminal communication unit may receive a transmission mode of the access link with the terminal while receiving the channel information of the access link, and the control unit may set the state of the backhaul link, a transmission mode, the transmission mode of the access link transmitted from the terminal, a relational expression for channel information, or an offset value to determine the transmission mode and transmission format of the terminal.

Also, the control unit may determine the number of terminals which can be simultaneously connected or terminals whose simultaneous connections are allowed, based on the state of the backhaul link.

Also, the control unit may increase the number of connectable terminals according to a service type required by the terminal requesting a connection, and reduce the number of terminals which can be simultaneously connected as the state of the backhaul link gets worse.

Also, the control unit may increase the number of terminals which can be simultaneously connected as an average transmission rate required by the terminal requesting a connection is reduced, and reduce the number of terminals which can be simultaneously connected as the average transmission rate is increased.

Also, the terminal communication unit may inform the terminal of whether transmission of a random access signal is allowed, in the form of a bitmap in advance.

Also, when the backhaul link is in a state incapable of processing connection attempts of all subscribed terminals, the control unit may instruct some terminals in which processing is disabled to perform communication by using a different communication method other than a current communication method.

Also, the mobile relay may use a plurality of antennas, and the mobile relay may transmit and receive data through a diversity scheme, beamforming, or MIMO (multiple input multiple output).

Still another aspect of the present disclosure provides a terminal operated as a mobile relay, including: a base station communication unit that transmits and receives data to and from a base station through a backhaul link; a sensing unit that senses a state of the backhaul link; a control unit that determines a transmission mode and transmission format of a smart device in consideration of the sensed state of the backhaul link; and a terminal communication unit that transmits the determined transmission mode and transmission format to the smart device.

Here, the terminal communication unit may transmit the state of the backhaul link to the smart device and receive channel information of an access link in response to the state of the backhaul link from the smart device, and the control unit may determine the transmission mode and transmission format of the smart device based on the channel information of the access link or the state of the backhaul link.

Also, the terminal communication unit may receive a transmission mode of the access link with the smart device while receiving the channel information of the access link, and the control unit may set the state of the backhaul link, a transmission mode, the transmission mode of the access link transmitted from the smart device, a relational expression for channel information, or an offset value to determine the transmission mode and transmission format of the smart device.

Also, the control unit may determine the number of smart devices which can be simultaneously connected or smart devices whose simultaneous connections are allowed, based on the state of the backhaul link.

Also, the control unit may increase the number of smart devices which can be simultaneously connected as the state of the backhaul link gets better, and reduce the number of smart devices which can be simultaneously connected as the state of the backhaul link gets worse.

Also, the control unit may increase the number of smart devices which can be simultaneously connected as an average transmission rate required by the smart devices requesting connections is reduced, and reduce the number of smart devices which can be simultaneously connected as the average transmission rate is increased.

Also, the terminal communication unit may inform the smart device of whether transmission of a random access signal is allowed, in the form of a bitmap in advance.

Also, when the backhaul link is in a state incapable of processing connection attempts of all subscribed smart devices, the control unit may instruct some smart devices in which processing is disabled to perform communication by using a different communication method other than a current communication method.

Also, the smart device may be a wearable device.

The mobile relay according to an embodiment of the present invention may efficiently transmit and receive data in consideration of the state of the backhaul link.

The mobile relay according to an embodiment of the present invention may transmit and receive data using a separately provided network, when the state of the backhaul link is bad.

MODES OF THE INVENTION

Figure 1:
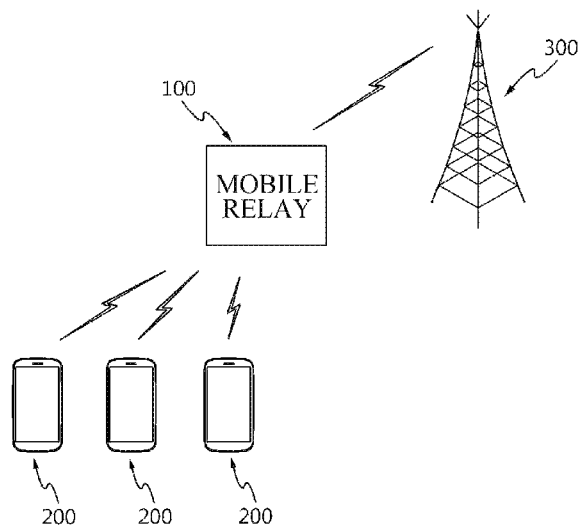
FIG. 1 is a block diagram illustrating a network system according to an embodiment of the present invention.

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention. In the following description, well-known functions or constructions are not described in detail if it is determined that they would obscure the invention due to unnecessary detail.

Throughout the drawings, whenever the same element reappears in a subsequent drawing, it is denoted by the same reference numeral.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, a relay and a method for operating the relay according to an embodiment of the present invention will be described in detail with reference to the accompanying drawings.

FIG. 1 is a block diagram illustrating a network system according to an embodiment of the present invention.

The network system according to an embodiment of the present invention includes a mobile relay 100, one or more terminals 200 subscribed to the mobile relay 100, and a base station 300. However, components shown in FIG. 1 are not essential, and thus a network system having a larger or smaller number of components than the number of components shown in FIG. 1 may be implemented.

The mobile relay 100 according to an embodiment of the present invention receives data from each of the one or more terminals 200 subscribed to the mobile relay 100, and transmits the received data to the base station 300. The mobile relay 100 relays data. In addition, the mobile relay 100 receives data from the base station 300, and transmits the received data to each of the one or more terminals 200. The mobile relay 100 according to an embodiment of the present invention may serve as a base station.

That is, the mobile relay 100 serves as a mobile base station that plays the role of the base station as is, and in this case, a backhaul link of the mobile relay 100 uses radio resources of a donor eNodeB 300.

The mobile relay 100 according to an embodiment of the present invention may be coupled to a transportation means, for example, a car or a train, and thereby be operable. In addition, the mobile relay 100 according to an embodiment of the present invention may be also moved by a user. In addition, the mobile relay 100 according to an embodiment of the present invention may be a terminal.

In addition, the mobile relay 100 according to an embodiment of the present invention may perform substantially the same function as a macro base station.

Each of the one or more terminals 200 according to an embodiment of the present invention transmits data to the mobile relay 100 to which the one or more terminals 200 are subscribed. In addition, each of the one or more terminals 200 transmits data to the base station 300 through the mobile relay 100 to which the one or more terminals 200 are subscribed. Each of the one or more terminals 200 according to an embodiment of the present invention receives data from the base station 300 through the mobile relay 100.

According to an embodiment of the present invention, a link between the one or more terminals 200 and the mobile relay 100 may be referred to as an access link. In addition, a link between the mobile relay 100 and the base station 300 may be referred to as a backhaul link. Each of the one or more terminals 200 transmits and receives data to and from the mobile relay 100 through an access link. The mobile relay 100 according to an embodiment of the present invention transmits and receives data to and from the base station 300 through a backhaul link.

The base station 300 according to an embodiment of the present invention may be a donor eNodeB.

Next, a state of a backhaul link according to a position of a mobile relay will be described with reference to FIGS. 2 and 3.

Figure 2:
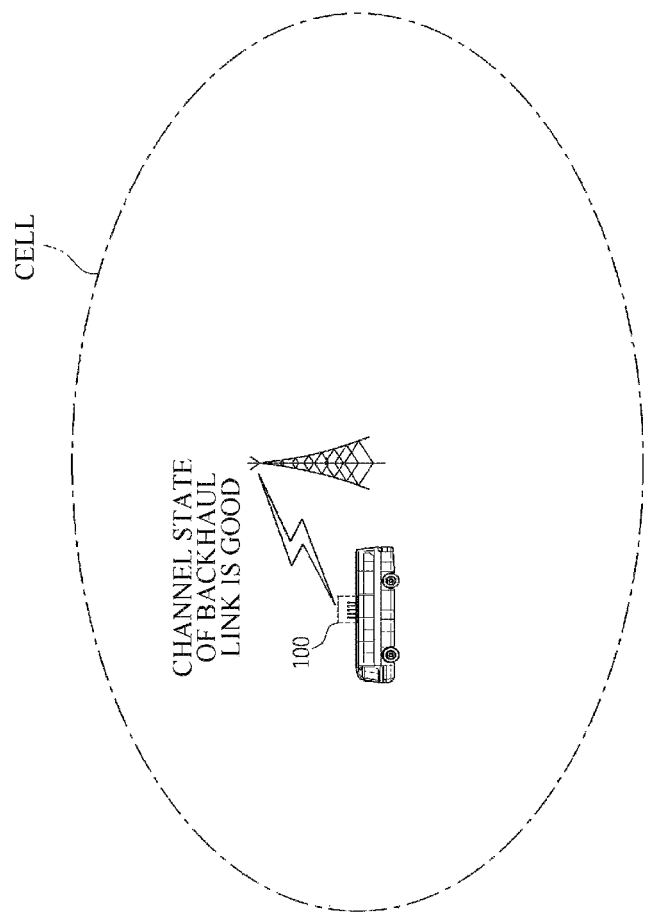
FIG. 2 is a schematic diagram illustrating a case in which a mobile relay is located near a base station.

FIG. 2 is a schematic diagram illustrating a case in which a mobile relay is located near a base station.

Referring to FIG. 2, in general, when the mobile relay 100 is located near the base station 300, a state of a backhaul link is good. According to an embodiment of the present invention, the fact that the state of the backhaul link is good may indicate that a channel state of the backhaul link is good.

In addition, in a case in which a multi-antenna is used in the mobile relay 100 and the base station 300, the fact that the mobile relay 100 is located near the base station 300 does not indicate that the state of the backhaul link is always the best. Accordingly, in conclusion, the fact that the channel state of the backhaul link is good may indicate that a data transmission rate (or speed) of the backhaul link is high.

Figure 3:
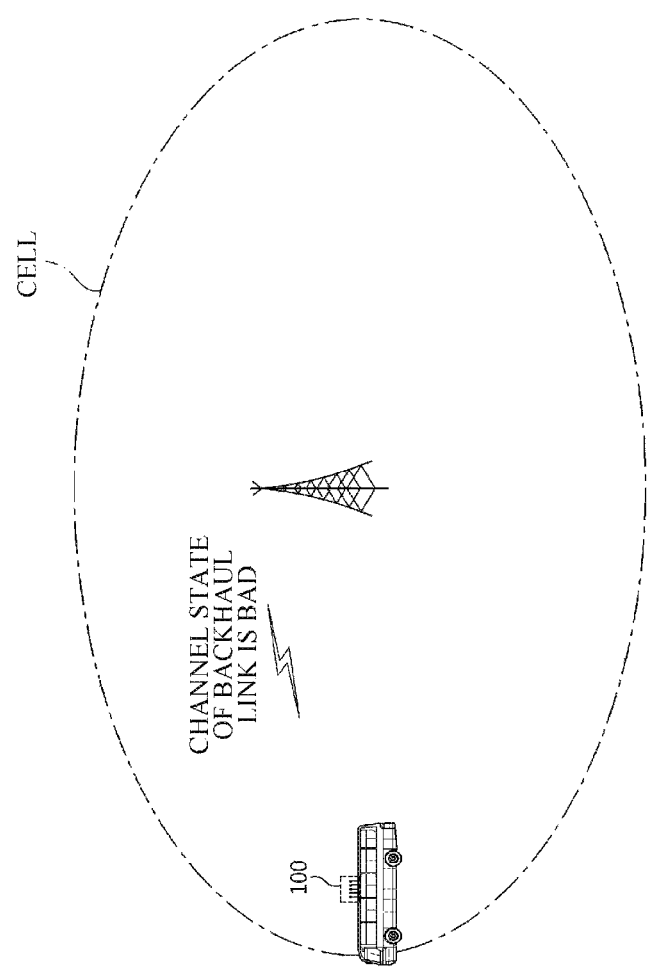
FIG. 3 is a schematic diagram illustrating a case in which a mobile relay is located at an edge of a cell.

FIG. 3 is a schematic diagram illustrating a case in which a mobile relay is located at an edge of a cell. In general, when the mobile relay 100 is located far from the base station 300, a state of a backhaul link may be bad.

When the mobile relay 100 is located at the edge of the cell, the state of the backhaul link may be bad due to a long distance between the mobile relay 100 and the base station 300. According to an embodiment of the present invention, the fact that the state of the backhaul link is bad may indicate that a channel state and data transmission state of the backhaul link is bad or a data transmission rate (or speed) of the backhaul link is low.

Since the position of the mobile relay 100 may be changed, the state of the backhaul link of the mobile relay 100 may be also changed according to the position of the mobile relay 100.

In general, the mobile relay 100 maintains a relatively short distance from the one or more terminals 200. That is, a distance between the mobile relay 100 and the base station 300 is longer than a distance between the mobile relay 100 and the one or more terminals 200.

The one or more terminals 200 according to a comparative example transmit channel information such as CQI (channel quality indicator) to the mobile relay 100 based on an access link between the mobile relay 100 and the one or more terminals 200. In addition, the one or more terminals 200 according to a comparative example determine a transmission mode and a transmission format based on the received channel information.

Access link channel information according to an embodiment of the present invention may include CQI, RI (rank indicator), PMI (precoding matrix indicator), and the like.

According to a comparative example, when the one or more terminals 200 transmit high CQI due to a short distance between the one or more terminals 200 and the mobile relay 100 and the state of the backhaul link is good, there is no significant problem in communication between the one or more terminals 200 and the base station 300.

However, when the one or more terminals 200 transmit high CQI due to a short distance between the one or more terminals 200 and the mobile relay 100 and the state of the backhaul link is bad, the mobile relay 100 determines the transmission mode and transmission format of the one or more terminals 200 without consideration of the state of the backhaul link, so that a larger amount of data than data capacity that can be processed by the backhaul link may be transmitted, which may cause problems.

The mobile relay 100 according to an embodiment of the present invention determines the transmission mode and transmission format of the one or more terminals 200 in consideration of the state of the backhaul link in order to solve the above-described problems.

Figure 4:
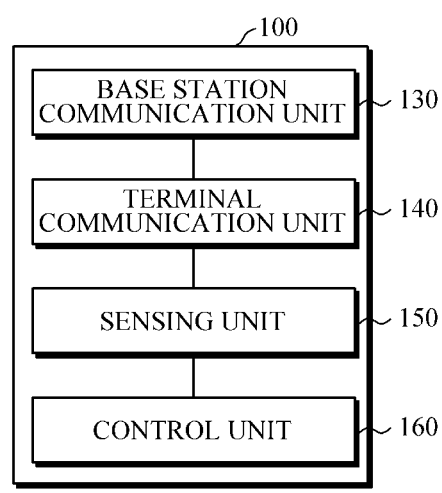
FIG. 4 is a block diagram illustrating a mobile relay according to an embodiment of the present invention.

FIG. 4 is a block diagram illustrating a mobile relay according to an embodiment of the present invention.

Referring to FIG. 4, the mobile relay 100 according to an embodiment of the present invention includes a base station communication unit 130, a terminal communication unit 140, a sensing unit 150, and a control unit 160.

The base station communication unit 130 according to an embodiment of the present invention transmits and receives data to and from the base station 300 through a backhaul link. The base station communication unit 130 according to an embodiment of the present invention may transmit and receive data to and from the base station 300 through one or more networks.

The terminal communication unit 140 according to an embodiment of the present invention transmits and receives data to and from each of the one or more terminals 200 subscribed to the mobile relay 100 through an access link. The terminal communication unit 140 according to an embodiment of the present invention may transmit backhaul link information to the terminals belonging to the mobile relay 100. The backhaul link information according to an embodiment of the present invention may include information about the state of the backhaul link. In addition, the terminal communication unit 140 may receive channel information of the access link from each of the one or more terminals 200. The terminal communication unit 140 may receive information required for determining a transmission method of the access link while receiving the channel information of the access link from each of the one or more terminals 200. The terminal communication unit 140 according to an embodiment of the present invention may receive channel information including CQI or the like transmitted in response to the state of the backhaul link, from the one or more terminals 200.

The sensing unit 150 according to an embodiment of the present invention senses the state of the backhaul link.

The control unit 160 according to an embodiment of the present invention controls general operations of the mobile relay 100. In addition, the control unit 160 controls a subscription state of the one or more terminals 200 with respect to the mobile relay 100. In addition, the control unit 160 may determine whether the one or more terminals 200 are subscribed to the mobile relay 100. The control unit 160 according to an embodiment of the present invention may determine a transmission mode and transmission format of the one or more terminals 200 in consideration of the state of the backhaul link. The control unit 160 according to an embodiment of the present invention may determine the number of terminals 200 which can be simultaneously connected to the mobile relay 100 or a terminal list in consideration of the state of the backhaul link. The control unit 160 according to an embodiment of the present invention determines the transmission mode and transmission format of the one or more terminals in consideration of the state of the backhaul link, so that efficient data transmission management of the access link is made possible even when the state of the backhaul link is changed. The control unit 160 according to an embodiment of the present invention may determine the transmission mode and transmission format of the one or more terminals 200 based on the channel information of the access link such as CQI or the like received in response to the state of the backhaul link.

The control unit 160 determines the transmission mode and transmission format of the one or more terminals 200 based on the received channel information of the access link.

The control unit 160 may determine the transmission mode and transmission format of the one or more terminals 200 based on the received channel information of the access link and the transmission mode of the access link transmitted from the one or more terminals 200.

The control unit 160 sets the state of the backhaul link, the transmission mode of the backhaul link, the transmission mode of the access link transmitted from the one or more terminals 200, a relational expression for the channel information of the access link, or an offset value, in order to determine the transmission mode and transmission format of the one or more terminals 200.

More specifically, according to an embodiment of the present invention, when the state of the backhaul link is changed according to a change in the position of the mobile relay 100, the control unit 160 determines the transmission mode and transmission format of the one or more terminals 200 in response to the change in the state of the backhaul link.

In addition, the control unit 160 according to an embodiment of the present invention may instruct the one or more terminals 200 to perform communication in a different communication method other than a current communication method, in consideration of the state of the backhaul link.

When the backhaul link is in a state incapable of processing connection attempts of all of the one or more terminals 200 subscribed to the mobile relay 100, the control unit 160 according to an embodiment of the present invention may instruct some terminals 200 in which processing is disabled to perform communication by using the different communication method other than the current communication method.

The control unit 160 may determine the number of terminals which can be simultaneously connected to the mobile relay and a terminal list according to the state of the backhaul link, based on a predetermined setting value.

Figure 5:
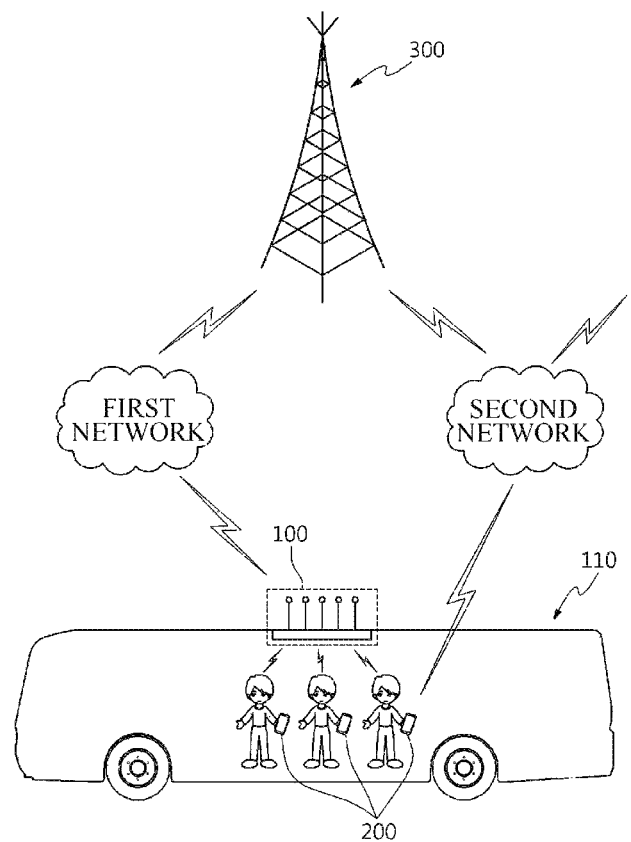
FIG. 5 is a diagram illustrating a case in which a mobile relay or a terminal according to an embodiment of the present invention uses a plurality of networks.

FIG. 5 is a diagram illustrating a case in which a mobile relay or a terminal according to an embodiment of the present invention uses a plurality of networks.

Referring to FIG. 5, the mobile relay 100 communicates with the base station 300 via a first network. When the control unit 160 instructs the one or more terminals 200 to communicate with the base station 300 in a different communication method other than a current communication method, the one or more terminals 200 may communicate with the base station 300 via a second network. In addition, the second network may be a different communication network such as Wi-Fi other than the network with the base station 300.

According to an embodiment of the present invention, when the first network is LTE, the second network may be LTE or Wi-Fi of the base station 300. However, the present invention is not limited thereto.

Next, an example of the use of a mobile relay according to an embodiment of the present invention will be described with reference to FIGS. 6 to 8.

Figure 6:
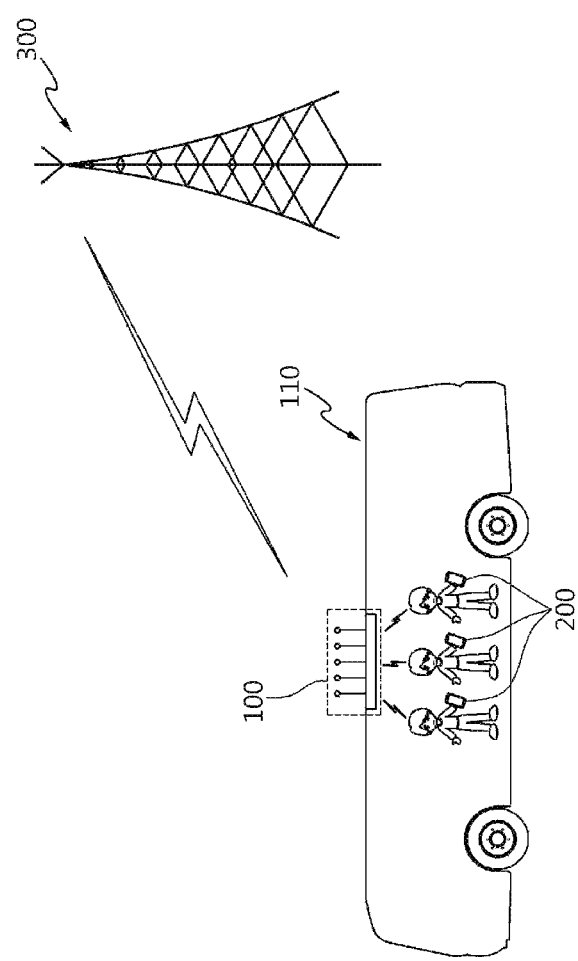
FIG. 6 is a diagram illustrating an example of the use of a mobile relay according to an embodiment of the present invention.

FIG. 6 is a diagram illustrating an example of the use of a mobile relay according to an embodiment of the present invention.

Referring to FIG. 6, the mobile relay 100 according to an embodiment of the present invention may be attached to a transportation means to be used. In FIG. 6, a case in which the transportation means is a bus 110 will be described, but the present invention is not limited thereto. Even in a case in which a different mobile relay 100 is attached to a different transportation means, the present invention is applicable.

Referring to FIG. 6, the mobile relay 100 according to an embodiment of the present invention transmits and receives data to and from each of the one or more terminals 200 of passengers of the bus 110. The mobile relay 100 according to an embodiment of the present invention transmits and receives data to and from the base station 300.

When the mobile relay 100 is attached to the transportation means to be used, a plurality of antennas may be installed in the transportation means, and therefore the plurality of antennas may be used. In addition, when the mobile relay 100 is attached to the transportation means to use a plurality of antennas, data may be transmitted and received through a diversity scheme that is a multi-antenna technology, beamforming, an MIMO (multiple input multiple output) technology, or the like, so that it may result in a beneficial effect in terms of data transmission. In addition, when being attached to the transportation means to be used, the mobile relay 100 may transmit and receive data through a communication device separately attached to the transportation means.

Figure 7:
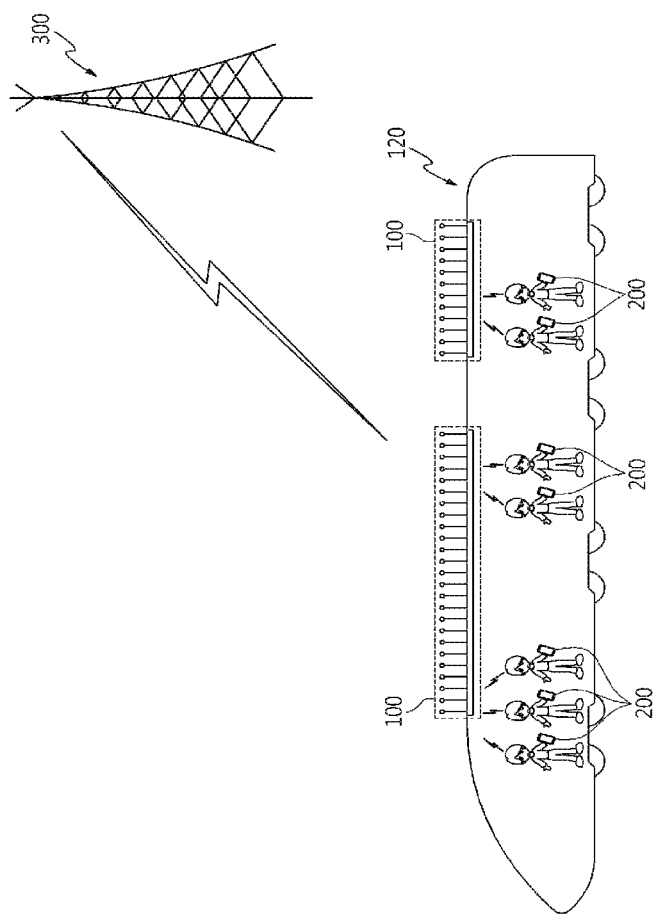
FIG. 7 is a diagram illustrating another example of the use of a mobile relay according to an embodiment of the present invention.

FIG. 7 is a diagram illustrating another example of the use of a mobile relay according to an embodiment of the present invention.

Referring to FIG. 7, the mobile relay 100 according to an embodiment of the present invention may be attached to a transportation means to be used. In FIG. 7, a case in which the transportation means is a train 120 will be described, but the present invention is not limited thereto. Even in a case in which a different mobile relay 100 is attached to a different transportation means, the present invention is applicable.

Referring to FIG. 7, the mobile relay 100 according to an embodiment of the present invention transmits and receives data to and from each of the one or more terminals 200 of passengers of the train 120. The mobile relay 100 according to an embodiment of the present invention transmits and receives data to and from the base station 300.

A plurality of mobile relays 100 according to an embodiment of the present invention may be arranged in a single transportation means.

According to an embodiment of the present invention, the mobile relay 100 determines the transmission mode and transmission format of the one or more terminals 200 according to the state of the backhaul link which is changed, and therefore it is possible to efficiently perform data management when the mobile relay 100 is attached to a transportation means whose position is rapidly changed, for example, a train or the like.

Figure 8:
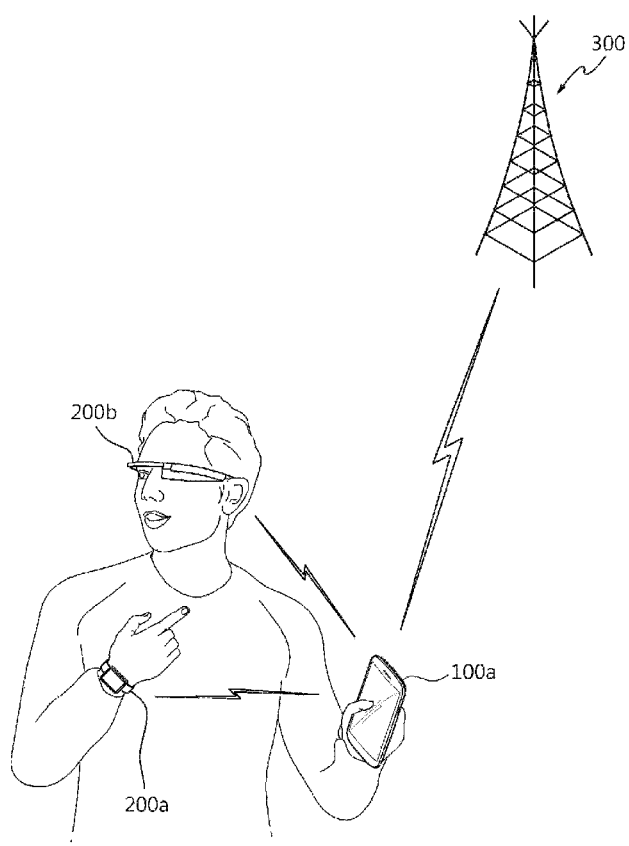
FIG. 8 is a diagram illustrating still another example of the use of a mobile relay according to an embodiment of the present invention.

FIG. 8 is a diagram illustrating still another example of the use of a mobile relay according to an embodiment of the present invention.

Referring to FIG. 8, according to an embodiment of the present invention, a terminal 100a may be operable as the above-described mobile relay. In this case, other smart devices 200a and 200b may perform the same function in place of the terminal subscribed to the above-described mobile relay. Accordingly, repeated description thereof will be omitted. At this point, the terminal 100a may be a mobile device such as a smart phone, a tablet PC, a notebook PC, or the like.

The smart device according to an embodiment of the present invention may be a wearable device such as a smart watch 200a or smart glasses 200b.

In FIG. 8, the smart watch or the smart glasses transmits and receives data to and from the terminal 100a serving as the mobile relay, but the present invention is not limited thereto. That is, in a case of a device that can transmit and receive data to and from the terminal in place of the smart watch 200a or the smart glasses 200b, the present invention is applicable.

However, hereinafter, the smart watch 200a or the smart glasses 200b will be described as an example.

According to an embodiment of the present invention, the terminal 100a serving as the mobile relay transmits and receives data to and from the smart watch 200a or the smart glasses 200b subscribed to the terminal 100a. In addition, the terminal 100a serving as the mobile relay transmits and receives data to and from the base station 300.

The terminal 100a serving as the mobile relay according to an embodiment of the present invention determines a transmission mode and transmission format of the one or more terminals 200 in consideration of a state of a backhaul link between the terminal 100a and the base station 300.

In general, in many cases, the wearable device cannot generate a large output when performing communication due to its small size. Thus, when performing communication with the base station 300 using the terminal 100a, the wearable device may generate a larger output compared to when performing communication with the base station 300 using the wearable device itself, and thus it is advantageous in terms of data transmission and reception.

Next, a method for operating a mobile relay according to an embodiment of the present invention will be described with reference to FIGS. 9 and 10.

Figure 9:
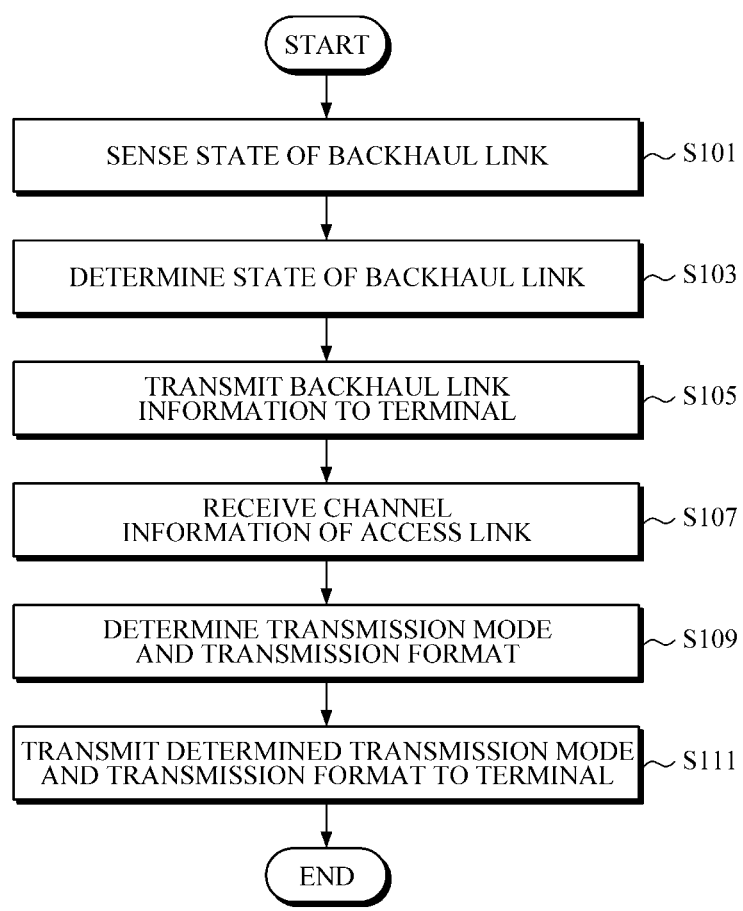
FIG. 9 is a flowchart illustrating a method for operating a mobile relay according to an embodiment of the present invention.

FIG. 9 is a flowchart illustrating a method for operating a mobile relay according to an embodiment of the present invention.

Referring to FIG. 9, in operation S101, the sensing unit 150 first senses a state of a backhaul link between the mobile relay 100 and the base station 300.

In operation S103, the control unit 160 determines the sensed state of the backhaul link. The control unit 160 determines whether the backhaul link is good or bad based on the sensed state of the backhaul link.

In operation S105, the terminal communication unit 140 transmits backhaul link information to the one or more terminals 200. At this point, the backhaul link information may include information about the state of the backhaul link.

The terminal communication unit 140 may receive channel information of an access link transmitted in response to the backhaul link information, from the one or more terminals 200. The one or more terminals 200 according to an embodiment of the present invention may transmit a transmission method of the access link, CQI, a transmission format of the access link, or the like based on the state of the backhaul link. The terminal communication unit 140 may receive the channel information of the access link, the CQI, and the transmission method and transmission format of the access link from the one or more terminals 200.

The control unit 160 determines the transmission mode and transmission format of the one or more terminals 200 based on the received channel information of the access link. The control unit 160 sets the state of the backhaul link, the transmission mode of the backhaul link, a relational expression for the transmission mode and channel state of the access link transmitted from the one or more terminals 200, or an offset value in order to determine the transmission mode and transmission format of the one or more terminals 200.

In operation S111, the terminal communication unit 140 transmits the determined transmission mode and transmission format of the one or more terminals 200 to the one or more terminals 200.

Figure 10:
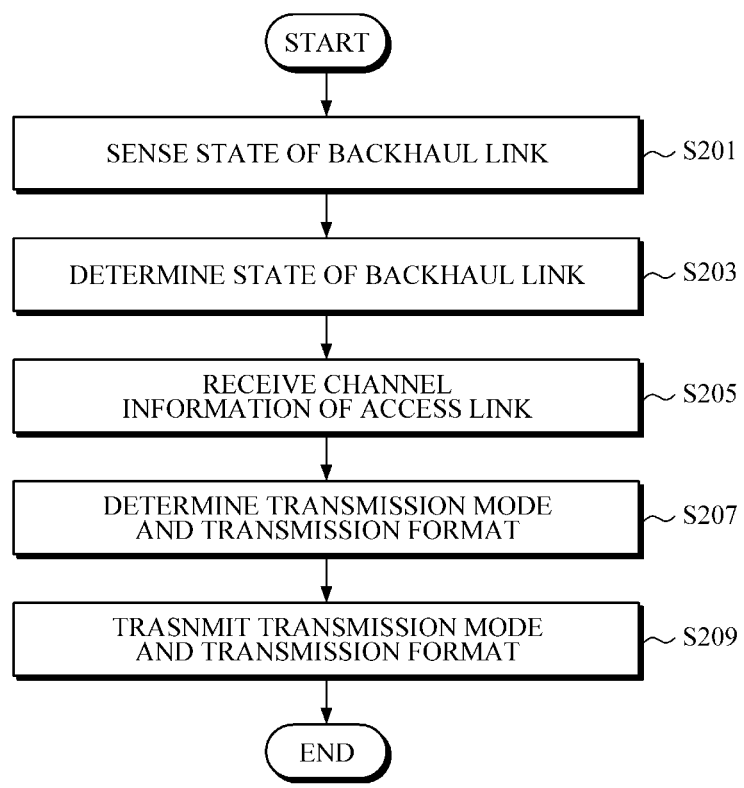
FIG. 10 is a flowchart illustrating a method for operating a mobile relay according to another embodiment of the present invention.

FIG. 10 is a flowchart illustrating a method for operating a mobile relay according to another embodiment of the present invention.

Referring to FIG. 10, in operation S201, the sensing unit 150 first senses a state of a backhaul link between the mobile relay 100 and the base station 300.

In operation S203, the control unit 160 determines the sensed state of the backhaul link. The control unit 160 determines whether the backhaul link is good or bad and an available transmission mode and transmission rate (or speed) of the backhaul link, based on the sensed state of the backhaul link.

In operation S205, the terminal communication unit 140 receives channel information of an access link from the one or more terminals 200 without separately transmitting information about the backhaul link to the one or more terminals. The one or more terminals 200 according to still another embodiment of the present invention may transmit the transmission method or transmission format of the access link and the channel information of the access link, in consideration of only the state of the access link without consideration of the state of the backhaul link.

In operation S207, the control unit 160 determines the transmission mode and transmission format of the one or more terminals 200 based on the sensed state of the backhaul link and the channel information of the access link received from the one or more terminals. The control unit 160 may determine the transmission mode and transmission format of the one or more terminals 200 even based on the channel information of the access link and the transmission method or transmission format of the access link.

In operation S209, the terminal communication unit 140 transmits the determined transmission mode and transmission format of the one or more terminals 200 to the one or more terminals 200.

Figure 11:
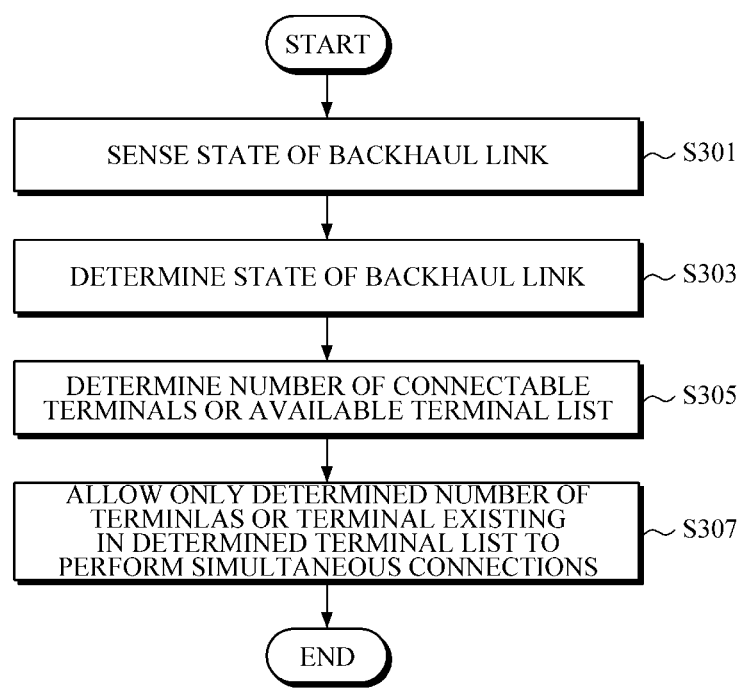
FIG. 11 is a flowchart illustrating a method for operating a mobile relay according to still another embodiment of the present invention.

FIG. 11 is a flowchart illustrating a method for operating a mobile relay according to still another embodiment of the present invention.

Referring to FIG. 11, in operation S301, the sensing unit 150 first senses a state of a backhaul link between the mobile relay 100 and the base station 300.

In operation S303, the control unit 160 determines the sensed state of the backhaul link. The control unit 160 determines whether the backhaul link is good or bad and an available transmission rate (or speed) of the backhaul link based on the sensed state of the backhaul link.

In operation 305, the control unit 160 determines the number of terminals which can be simultaneously connected to the mobile relay or a terminal list based on the determined state of the backhaul link. As the state of the backhaul link gets better, the control unit 160 may increase the number of terminals that can be simultaneously connected to the mobile relay. As the state of the backhaul link gets worse, the control unit 160 may reduce the number of terminals that can be simultaneously connected to the mobile relay. In addition, the control unit 160 may determine the number of terminals that can be simultaneously connected to the mobile relay and the terminal list according to the state of the backhaul link, based on a predetermined setting value or QoS (quality of service) requirements of services used by each of the one or more terminals.

In operation S307, the control unit 160 allows only the determined number of terminals 200 or the terminal belonging to the terminal list to simultaneously connect to the mobile relay. At this point, the terminal communication unit 140 may inform the terminals 200 belonging to the mobile relay 100 of whether a random access signal can be transmitted to the terminal whose connection is allowed, in the form of a bitmap or the like in advance. According to an embodiment of the present invention, the terminal 200 in which the transmission of the random access signal is allowed may be determined by the control unit 160.

At this point, the number of terminals of which connection is allowed and the terminal list thereof may be changed in real time according to the state of the backhaul link and the services and state of the terminal.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. A mobile relay in a network system comprising an antenna, the mobile relay being configured to:
    transmit and receive data to and from a base station through a backhaul link using the antenna;
    sense a state of the backhaul link;
    receive channel information of an access link from a terminal without separately transmitting the sensed state of the backhaul link to the terminal using the antenna;
    determine a transmission mode and a transmission format of the terminal based on the sensed state of the backhaul link and the channel information of the access link received from terminal; and
    transmit the determined transmission mode and transmission format to the terminal using the antenna,
    wherein the state of the backhaul link is changed according to a change in a position of the mobile relay, and
    wherein the determined transmission mode and transmission format are used by the terminal to transmit data through the access link between the mobile relay and the terminal.

2. The mobile relay of claim 1, wherein the mobile relay is configured to:
    transmit the state of the backhaul link to the terminal and receive channel information of the access link, using the antenna, in response to the state of the backhaul link from the terminal, and
    determine the transmission mode and transmission format of the terminal based on the channel information of the access link.

3. The mobile relay of claim 2, wherein the mobile relay is configured to:
    receive a transmission mode of the access link with the terminal while receiving the channel information of the access link using the antenna, and
    set the state of the backhaul link, a transmission mode, the transmission mode of the access link transmitted from the terminal, a relational expression for channel information, or an offset value to determine the transmission mode and transmission format of the terminal.

4. The mobile relay of claim 1, wherein the mobile relay determines the number of terminals which can be simultaneously connected or terminals whose simultaneous connections are allowed, based on the state of the backhaul link, a service type of the terminal, or a required QoS (quality of service).

5. The mobile relay of claim 4, wherein the mobile relay increases the number of terminals which can be simultaneously connected as the state of the backhaul link gets better, and reduces the number of terminals which can be simultaneously connected as the state of the backhaul link gets worse.

6. The mobile relay of claim 5, wherein the mobile relay informs the terminal of whether transmission of a random access signal is allowed, in a form of a bitmap in advance.

7. The mobile relay of claim 1, wherein, when the backhaul link is in a state incapable of processing connection attempts of all subscribed terminals, the mobile relay instructs some terminals in which processing is disabled to perform communication by using a different communication method other than a current communication method.

8. A vehicle to which a mobile relay is attached and comprising an antenna, the mobile relay being configured to:
   transmit and receive data to and from a base station through a backhaul link using the antenna;
   sense a state of the backhaul link;
   receive channel information of an access link from a terminal without separately transmitting the sensed state of the backhaul link to the terminal using the antenna;
   determine a transmission mode and transmission format of the terminal based on the sensed state of the backhaul link and the channel information of the access link received from terminal; and
   transmit the determined transmission mode and transmission format to the terminal using the antenna,
   wherein the state of the backhaul link is changed according to a change in a position of the mobile relay, and
   wherein the determined transmission mode and transmission format are used by the terminal to transmit data through the access link between the mobile relay and the terminal.

9. The vehicle of claim 8, wherein the mobile relay transmits the state of the backhaul link to the terminal and receives channel information of an access link in response to the state of the backhaul link from the terminal using the antenna, and
   the mobile relay determines the transmission mode and transmission format of the terminal based on the channel information of the access link.

10. The vehicle of claim 9, wherein the mobile relay receives a transmission mode of the access link with the terminal while receiving the channel information of the access link using the antenna, and
    the mobile relay sets the state of the backhaul link, a transmission mode, the transmission mode of the access link transmitted from the terminal, a relational expression for channel information, or an offset value to determine the transmission mode and transmission format of the terminal.

11. The vehicle of claim 8, wherein the mobile relay determines the number of terminals which can be simultaneously connected or terminals whose simultaneous connections are allowed, based on the state of the backhaul link.

12. The vehicle of claim 11, wherein the mobile relay increases the number of connectable terminals according to a service type required by the terminal requesting a connection, and reduces the number of terminals which can be simultaneously connected as the state of the backhaul link gets worse.

13. The vehicle of claim 11, wherein the mobile relay increases the number of terminals which can be simultaneously connected as an average transmission rate required by the terminal requesting a connection is reduced, and reduces the number of terminals which can be simultaneously connected as the average transmission rate is increased.

14. The vehicle of claim 11, wherein the mobile relay informs the terminal of whether transmission of a random access signal is allowed, in a form of a bitmap in advance.

15. The vehicle of claim 8, wherein, when the backhaul link is in a state incapable of processing connection attempts of all subscribed terminals, the mobile relay instructs some terminals in which processing is disabled to perform communication by using a different communication method other than a current communication method.

16. The vehicle of claim 8, wherein the mobile relay uses a plurality of antennas, and the mobile relay transmits and receives data through a diversity scheme, beamforming, or MIMO (multiple input multiple output).

* * * * *